Nov. 9, 1943.  J. W. GILLON ET AL  2,333,776
SHUTTER OPERATING DEVICE
Original Filed Jan. 31, 1941
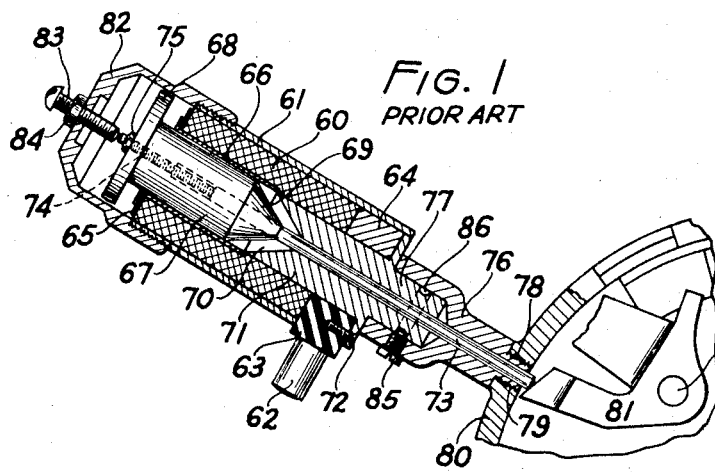
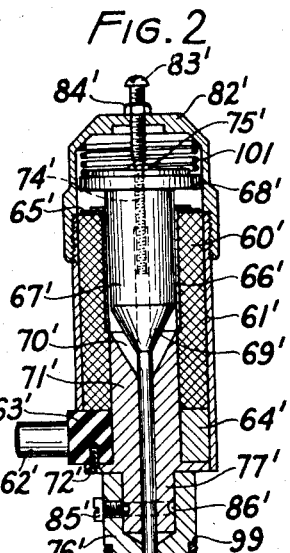
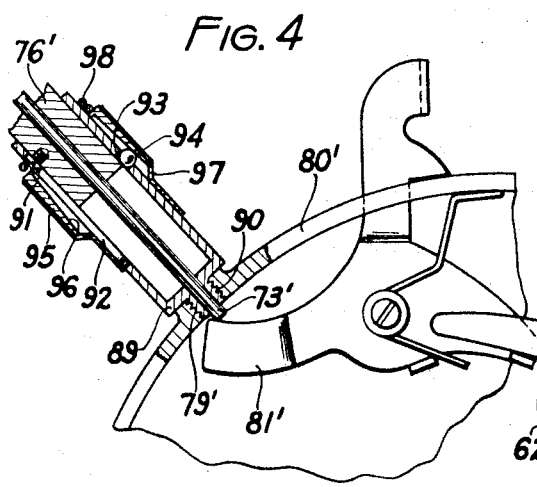
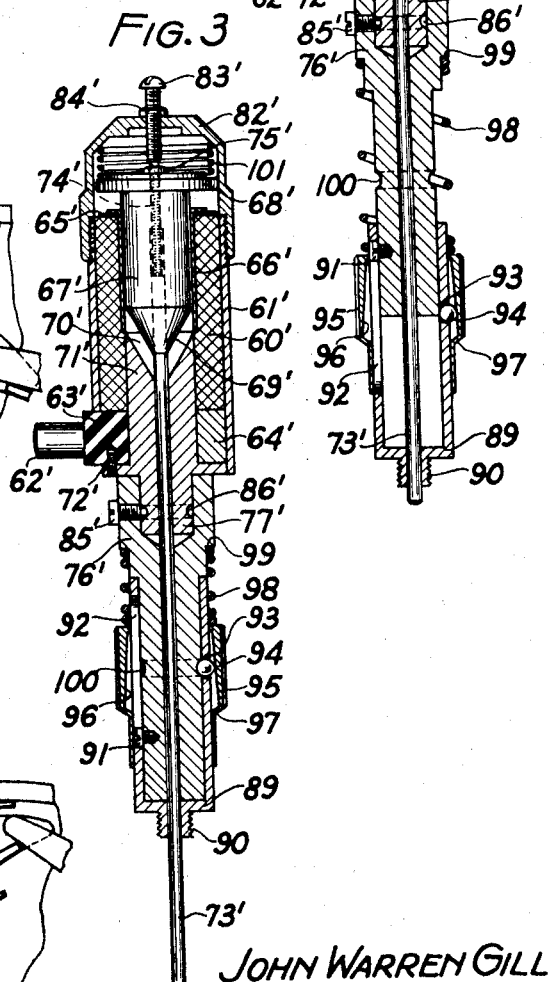
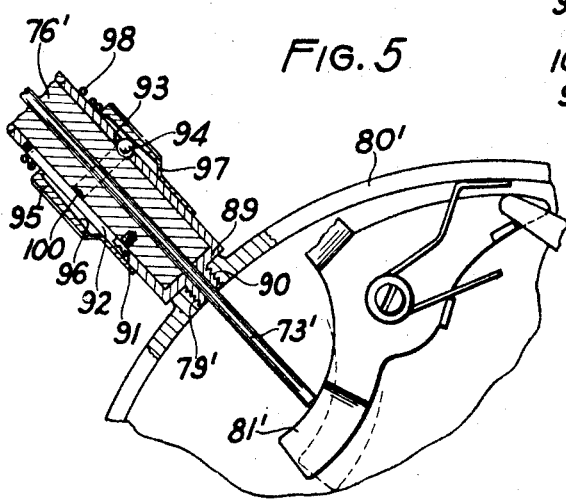
JOHN WARREN GILLON
JOHN C. HOLLISTER
INVENTORS
BY
ATTORNEYS Patented Nov. 9, 1943

2,333,776

UNITED STATES PATENT OFFICE 2,333,776

SHUTTER OPERATING DEVICE

John Warren Gillon, Rochester, N. Y., and John C. Hollister, Denver, Colo., assignors of one-half to Eastman Kodak Company, Rochester, N. Y., a corporation of New Jersey, and one-half to Heiland Research Corporation, Denver, Colo., a corporation of Colorado Original application January 31, 1941, Serial No. 376,844. Divided and this application November 1, 1941, Serial No. 417,538

10 Claims. (Cl. 74—2)

The present invention relates to photography, and particularly to an electro-magnetic shutter tripper for tripping the shutter of a photographic camera.

This application is a division of our copending application, Serial No. 376,844, filed January 31, 1941, and entitled, "Flash light synchronizing apparatus."

One object of the present invention is to provide an electro-magnetic shutter tripper particularly adapted for use with the timing device set forth in our above-noted parent application, and which shutter tripper is adapted for tripping a setting-type shutter, the release member of which requires a much greater throw than the throw found necessary in shutters ordinarily used in flash photography.

Another object of the present invention is to provide a shutter tripper of the type set forth which may be cocked to reduce the throw necessary for releasing a shutter of the type referred to as compared to the release throw necessary in other shutters.

A further object is to provide a shutter tripper of the type set forth which may be released from said cocked position to permit said shutter release member to return sufficiently to its inoperative position to permit the shutter to be set.

And another object is to provide a shutter tripper of the type described which is adapted to be automatically locked in its cocked position upon movement thereto, and from which cocked position it can be manually released.

And still a further object is the provision of an electro-magnetic shutter tripper of the type set forth which is compact, rugged in construction, efficient in operation, and capable of ready attachment to a photographic shutter in operative relation with the trigger thereof.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawing in which, Fig. 1 is a sectional view of a well-known type of electro-magnetic shutter tripper adapted to be used with the timing device set forth in our above-noted parent application, and showing the same in operative relation to the release member of a well-known type of photographic shutter, Fig. 2 is a sectional view of a shutter tripper constructed in accordance with a preferred embodiment of the present invention, and showing the same in an uncocked position, Fig. 3 is a sectional view similar to that of Fig. 2 by showing the shutter tripper in a cocked position, Fig. 4 is a sectional view showing the shutter tripper constructed in accordance with the present invention attached to a photographic shutter for use with which it was designed, and showing the tripper member of the tripper and the release member of the shutter in the relative positions they assume when the shutter tripper is in an uncocked position, and, Fig. 5 is a view similar to Fig. 4 but showing the tripper member of the shutter tripper and the release member of the shutter in the relative positions that they assume when the shutter tripper is cocked.

Like reference characters refer to corresponding parts throughout the drawing.

Generally speaking, the present invention relates to an electro-magnetic shutter tripper particularly designed to trip shutters of the setting type in which the release of the shutter requires a throw of the shutter release member appreciably longer than the throw required of the release member in most shutters for the same purpose. This tripper is so designed that it may be manually cocked, and in which condition the tripper member moves the shutter release member to a point short of actual shutter release, by an amount equal to the throw necessary in most shutters for releasing the same. Therefore, the actual release throw required of the tripper member by the magnetic coil of the tripper is the same as the throw required of any electro-magnetic tripper used on a shutter requiring a normal release throw. This construction not only permits a setting shutter of the type set forth to be released by an electro-magnetic tripper, but provides a device which permits this type of shutter to be synchronized by means of the timing device set forth in our above-noted parent application. When this tripper is manually released from its cocked condition, the tripper member proper is automatically moved to a retracted position to permit the shutter to be set.

Referring now to Fig. 1, a well-known type of solenoid suitable for use as a shutter tripper and relay in connection with the timing device set forth in the parent application will be described. This solenoid comprises an annular magnetic coil 60 encased in a shell 61 from the side of which projects two electrical jacks 62, electrically connected to the coil and onto which a conventional electrical extension may be placed to connect the coil to a source of potential energy, such as dry cell batteries, etc. The jacks 62 are directly carried by an insulating block 63, but this block is in turn connected to and supported by a ring of metal 64 partially surrounding the coil.

The top of the coil is covered by a metal ring 65 and the interior of the coil is lined with a metal sleeve 66 turned over at the top to hold the ring 65 in place and form a stop for the plunger of the solenoid as hereinafter set forth. Slidably mounted within the sleeve 66 is a plunger 67 having an enlarged top 68 which comes against the turned over edge of the sleeve 66 to limit the movement of the plunger in one direction. The lower end 69 of the plunger is tapered as shown to correspond with the tapered end 70 of the metal plug 71 extending into the lower end of the coil and fastened in place by screws 72. The corresponding tapered portions of the plunger and plug provide a stronger magnetic pull between the plug and the plunger, and are not designed so as to provide a stop for the plunger.

The plunger carries a rod 73 which extends through a bore in the plunger and is movable relative thereto. The upper end 74 of the rod 73 is threaded to engage a tapped portion of the bore in the plunger, and extends through the top of the plunger, and carries a lock nut 75. This rod also slidably extends through the metal plug 71 and an attaching sleeve 76 rotatably mounted on the projection 77 of the plug, the lower end of the said attaching sleeve including a threaded portion 78 which is adapted to be screwed into the cable release socket 79 found on most between-the-lens types of shutters, e. g. 80, on the market.

When the solenoid is mounted on the shutter casing by screwing the attaching sleeve 76 into the cable release socket, the rod 73, carried by the plunger, is in a position to engage the release member 81 of the shutter. In fact, the rod 73 and the plunger 67 are normally supported in a raised position shown in Fig. 1 by the shutter release member which is normally spring pressed clockwise of the pivot point 32 by a spring, not shown. The shutter is released when the release member 81 is moved counterclockwise from the position shown in Fig. 1 and which movement is adapted to be effected by the rod 73 when the plunger is pulled downwardly by the coil upon being energized. After the plunger is pulled downwardly by the coil to actuate the shutter, it is again returned to the position shown by the spring of the shutter acting on the release member 81 so that no cocking of the solenoid is required.

Since the throw of the release member 81 necessary to release the shutter may vary to some extent in different shutters, the movement of the plunger 67 and the rod 73 must be adjusted to the particular shutter with which the solenoid is to be used. This is done by loosening the lock nut 75 and turning the plunger relative to the rod until the shutter just trips when the head 68 of the plunger 67 comes to a stop against the turned-over edge of the sleeve 66. In order to insure the arrival of the plunger 67 at its lowermost position within a given time after energization of the circuit by a given current, means must be provided to limit the uppermost position of the plunger. To this end, the cap 82 is screwed onto the top of the plunger and carries an adjusting screw 83 which is adapted to be engaged by the end of the rod 73. After the effective length of the rod 73 has been adjusted, as set forth above, the screw 83 is turned down until the shutter just trips when the coil is energized by the source of potential energy with which it is to be used. This adjusting screw 83 is locked in its adjusted position by tightening down the lock nut 84 carried thereby. The attaching sleeve 76 is rotatably connected to the projection 77 of the plug 71 by a set screw 85 extending therethrough and into a circumferential groove 86 in said projection. By loosening the set screw 85, the solenoid as a whole can be rotated relative to the attaching sleeve 76 to place the jacks 62 in a convenient location after which the set screw is retightened.

While the above-described solenoid is adapted for use with most photographic shutters, we have found that it cannot be used to trip certain slower speed shutters of the setting type due to the fact that the release member of the latter-mentioned shutter requires a release throw which is much longer than that found in the faster shutters, and a release throw which the solenoid described is not capable of giving. Also, a greater force than the solenoid can produce is required since the movement not only trips the shutter but first must set it. The shutter shown in U. S. Patent 2,129,561, Brueck, September 6, 1938, is illustrative of one of slower shutters mentioned, and parts thereof are shown in Figs. 4 and 5 to show the use of our novel tripper. For instance, referring to Figs. 4 and 5, the throw characteristics of the release lever of one of these last-mentioned shutters is clearly illustrated. In Fig. 4, the release member 81' of one of these slow shutters is shown in a cocked position, and it will be noticed that in this position the lever returns to approximately the same position relative to the cable release socket 79' as does the release member 81 of the faster shutter in its uncocked position. However, in order to release the shutter, the release member 81' must move to the position shown in dotted lines in Fig. 5, and it will be noticed that this movement would require a throw of the plunger of the solenoid which a solenoid of the type set forth above would not be capable of.

So that these referred to slower shutters can be synchronized with a flash lamp by means of the timing device set forth in the above-noted parent application, the solenoid shutter tripper of the prior art must be modified to accommodate the increased movement of the release member required in the shutter without requiring an increase in the distance that the coil must move the plunger, and at the same time permit the shutter release member to return to its full inoperative position necessary for a setting of the shutter.

To this end, the solenoid shutter tripper of the prior art is modified as set forth below. Referring to Figs. 2 and 3, the solenoid shutter tripper as modified by us is essentially the same as that previously set forth above, with the exception of the attaching sleeve 76 and the parts associated therewith, as will be set forth, and the corresponding parts of the two shutter trippers are referred to by the same reference characters with those on our modified tripper being designated by primes ('). In our modified tripper, the attaching sleeve 76' is connected to the projection 77' as set forth in connection with the tripper of the prior art but differs therefrom in that it is much longer than said other sleeve and does not screw directly into the cable release socket 79' of the shutter casing 80'.

Slidably mounted on the exterior of the attaching sleeve 76' is an attaching tube 89, the lower end of which is provided with a threaded portion 90 adapted to be screwed into the cable release socket of the shutter casing for attaching the unit as a whole to said casing. The rod 73' connected to the plunger 67' is made long enough to extend through the end of the attaching tube 89 by the same amount as the rod 73 of the prior art solenoid when the solenoid is in its uncocked position, see Figs. 2 and 4. This allows the release member 81' of the shutter to return to its full inoperative position to permit the shutter being cocked, or set, when the solenoid is moved to its uncocked position.

The sliding movement of the attaching tube 89 relative to the attaching sleeve 76' is limited by a screw 91 threaded into the sleeve 76' and extending through an elongated slot 92 in the tube. The tube also includes one or more holes 93 in each of which is loosely seated a ball 94. Each ball 94 is held in its respective hole 93 by a locking collar 95 surrounding and slidably mounted on the attaching tube 89. The inside surface of this collar 95 tapers downwardly, as shown at 96, so that when the collar is in the position shown in Fig. 3, the ball is forced into its seat toward the surface of the attaching sleeve, and when the collar is in the position shown in Fig. 2, the ball 94 can move outwardly of the attaching tube. The lower end of the collar 95 is spun over as shown at 97 so that the ball, or balls, 94 cannot fall out of the holes in the attaching tube 89. A coiled compression spring 98 located between a shoulder 99 on the attaching sleeve 76' and the top of the locking collar 95 normally acts to move the collar downwardly, or the attaching sleeve 76' and the solenoid proper upwardly, depending upon which of the two is capable of movement, as will be clearly set forth below. The attaching sleeve 76' includes a circumferential groove 100 into which the ball, or balls, 94 are adapted to be forced and held by the collar 95 when the solenoid is moved to its cocked position, shown in Fig. 3, whereby the solenoid is adapted to be locked in its cocked position.

Referring still to Figs. 2 and 4 wherein the solenoid shutter tripper is shown in its uncocked position, it will be noticed that the ball 94 is at the lower end of the locking collar 95 and that the collar cannot move downwardly relative to the ball because of the taper 96 thereof engaging said ball. Since the collar cannot move, the spring 98 has moved the attaching sleeve 76' and the solenoid proper from the attaching tube and the rod 73' from its extended position within the shutter casing 80'. This permits the release member 81' of the shutter to move to its full inoperative position, shown in Fig. 4, so that the shutter can be set. To cock the tripper, the solenoid proper and the adjusting sleeve 76' are pressed downwardly against the action of the compression spring 98. When the adjusting sleeve 76' has been moved downwardly far enough to bring the groove 100 therein opposite the ball 94, the ball being normally forced toward the sleeve by the action of the tapered surface of the locking collar will snap into the groove.

As soon as the ball snaps into the groove 100, the collar will be momentarily released whereupon the spring 98 will move it downwardly until the tapered surface engages the ball and locks it in the circumferential groove 100. Thus the sleeve 76' and the solenoid proper will be locked in the cocked position shown in Figs. 3 and 5, in which position the rod 73' has moved the shutter release 81' to a point in its throw just short of its position of release, the dotted line position of the release in Fig. 5 indicating the position of the release member of the shutter when actuating the shutter. The plunger 66' will be necessarily supported in its raised position by the spring acting on the shutter release 81', and the screw 83' will be adjusted so that the movement of the rod 73' by said plunger 67' to release the shutter will be substantially equal to the movement required of the plunger in the prior art device for the same purpose. After the tripper is cocked, the coil thereof upon energization will pull the plunger and rod downwardly by an amount sufficient to release the shutter.

We have found that even when the shutter release lever 81' of these slow tripping shutters is set to the position shown in Fig. 5, a resistance greater than the force exerted by the solenoid tripper is sometimes encountered. To overcome this condition, we have introduced a novel device consisting of a spring 101 which exerts a pressure in the same direction as that of the plunger when the solenoid is energized. This spring, while of insufficient strength to operate the shutter alone, adds enough force to that of the energized solenoid to easily actuate the shutter.

Before the shutter can be set, it will be appreciated that the rod 73' must be retracted from the shutter casing to the point shown in Fig. 4. This is done by merely unlocking the tripper and allowing it to return to its uncocked position. To do this, the locking collar 95 is grasped and moved upwardly against the pressure of the spring 98. This moves the lower end of the collar opposite the ball 94 so that the same can move out of the groove 100 in the sleeve 76'. When the collar is moved upwardly, the spring 98 immediately acts to move the sleeve 76' and the solenoid upwardly whereupon the ball is forced out of the groove 100 and the lock is released. It might be pointed out that the depth of the groove 100 should be less than the radius of the ball 94 so that when the sleeve tends to move, the ball will be radially forced out of the groove. The instant the groove 100 is moved out of alignment with the ball 94, the collar 95 may be released for then the ball will only be moved against the smooth surface of the sleeve by a downward movement of the collar, and the friction between the rolling ball and a smooth surface will not be sufficient to prevent the spring from moving the sleeve 76' and the solenoid to the uncocked position shown in Figs. 2 and 4.

From the above description it will be readily appreciated that we have provided an electromagnetic shutter tripper which can be used to trip shutters that electro-magnetic trippers of the prior art are not capable of tripping. Furthermore, this electro-magnetic tripper is constructed so that it can be used with the timing device set forth in our above-noted parent application, of which this application is a division, in place of the prior art tripper, without altering the regular operation of said timing device in any way whatsoever.

Although we have shown and described certain specific embodiments of our invention, we are fully aware that many modifications thereof are possible. Our invention, therefore, is not to be restricted except insofar as is necessitated by the scope of the appended claims.

Having thus described our invention, what we claim is new and desire to secure by Letters Patent of the United States is:

1. A shutter tripper adapted for use with a photographic shutter having a release member, and comprising a sleeve adapted to be fixedly mounted relative to said release member, a plunger for actuating said release member and connected to said sleeve to move relative thereto in one direction between a cocked position, and a shutter actuating position, and in the opposite direction to an uncocked position, means for moving said plunger to said cocked position, means for releasably locking said plunger in said cocked position, means for moving said plunger from said cocked position to the shutter actuating position, means for releasing said locking means, and means for automatically returning said plunger to said uncocked position upon release of said locking means.

2. A shutter tripper adapted for use with a photographic shutter having a release member, and comprising a sleeve adapted to be fixedly mounted relative to said release member, a plunger for actuating said release member and connected to said sleeve to move relative thereto in one direction between a cocked position, and a shutter actuating position, and in the opposite direction to an uncocked position, means for moving said plunger to said cocked position, means for automatically releasably locking said plunger in said cocked position when the same reaches said position, means for moving said plunger from said cocked position to the shutter actuating position, means for releasing said locking means, and means for automatically returning said plunger to said uncocked position upon release of said locking means.

3. A shutter tripper adapted for use with a photographic shutter having a release member, and comprising a sleeve adapted to be fixedly mounted relative to said release member, a housing movably mounted on said sleeve to move to and from a cocked position relative thereto, a plunger for actuating said release member reciprocally mounted in said housing to move therewith to said cocked and uncocked position, and movable relative thereto to move beyond said cocked position to a shutter operating position, means for automatically locking said housing in said cocked position when the same is moved thereto, means for moving said plunger relative to said housing to release said shutter, means for releasing said housing from said cocked position, and means for moving said housing and plunger to said uncocked position upon release of said locking means.

4. A shutter tripper adapted for use with a photographic shutter having a release member, and comprising a sleeve adapted to be fixedly mounted relative to said release member, a plunger for actuating said release member and connected to said sleeve to move relative thereto in one direction between a cocked position, and a shutter actuating position, and in the opposite direction to an uncocked position, means for manually moving said plunger to said cocked position, means for automatically releasably locking said plunger in said cocked position the instant the same reaches said position, electromagnetic means for moving said plunger from said cocked position to said shutter actuating position, means for releasing said locking means, and a spring for automatically returning said plunger to said uncocked position upon release of said locking means.

5. A shutter tripper adapted for use with a photographic shutter having a release member, and comprising a sleeve adapted to be fixedly mounted relative to said release member, a housing movably mounted on said sleeve to move to and from a cocked position relative thereto, a plunger for actuating said release member reciprocally mounted in said housing to move therewith to said cocked and uncocked positions, and movable relative thereto to move beyond said cocked position to a shutter operating position, a spring normally moving said housing and plunger to said uncocked position, means for automatically locking said housing in said cocked position when the same is moved thereto, said locking means including said aforementioned spring, means for moving said plunger relative to said housing to release said shutter, and means for releasing said locking means to permit said housing and plunger to return to said uncocked position.

6. A shutter tripper adapted for use with a photographic shutter having a release member, and comprising a sleeve adapted to be fixedly mounted relative to said release member, a housing movably mounted on said sleeve to move to and from a cocked position relative thereto, a plunger for actuating said release member reciprocally mounted in said housing to move therewith to said cocked and uncocked positions, and movable relative thereto to move beyond said cocked position to a shutter operating position, a spring normally moving said housing and plunger to said uncocked position, means for automatically locking said housing in said cocked position when the same is moved thereto, said locking means including a collar surrounding said sleeve and movable longitudinally thereof, between release and locking positions, and normally moved to said locking position by said aforementioned spring, means for moving said plunger relative to said housing to release said shutter, and means for releasing said locking means to permit said housing and plunger to return to said uncocked position.

7. A shutter tripper adapted for use with a photographic shutter having a release member, and comprising a sleeve adapted to be fixedly mounted relative to said release member, a housing movably mounted on said sleeve to move to and from a cocked position relative thereto, a plunger for actuating said release member reciprocally mounted in said housing to move therewith to said cocked and uncocked positions, and movable relative thereto to move beyond said cocked position to a shutter operating position, a spring normally moving said housing and plunger to said uncocked position, means for automatically locking said housing in said cocked position when the same is moved thereto, said locking means including a locking member carried by said sleeve and movable into and out of locking engagement with a deformation in said housing when the same is moved to its cocking position, a collar surrounding said sleeve and locking member and movable longitudinally thereof between release and locking positions, said collar in said locking position adapted to force and hold said locking member in locking engagement with the deformation in said housing, and in said release position adapted to free said locking member, said collar normally moved to its locking position by said aforementioned spring and manually movable against the action of said spring to a release position, and means for moving said plunger relative to said housing to actuate said shutter.

8. A shutter tripper adapted for use with a photographic shutter having a release member, and comprising a sleeve adapted to be fixedly mounted relative to said release member, a housing movably mounted on said sleeve to move to and from a cocked position relative thereto, a plunger for actuating said release member reciprocally mounted in said housing to move therewith to said cocked and uncocked positions, and movable relative thereto to move beyond said cocked position to a shutter operating position, a spring normally moving said housing and plunger to said uncocked position, means for automatically locking said housing in said cocked position when the same is moved thereto, said locking means including a ball loosely mounted in and extending through an opening in said sleeve and engaging said housing, said ball adapted to enter a corresponding recess in said housing when the latter is moved to its cocked position, a collar surrounding said sleeve and ball and movable longitudinally thereof between release and locking positions, said collar having a surface engaging said ball and adapted to move the same into, and hold the same in, said recess when moved to its locking position, and adapted to free said ball and permit the same to leave said recess when moved to its release position, said collar normally moved to its locking position by said aforementioned spring and manually movable against the action of said spring to a release position, and means for moving said plunger relative to said housing to actuate said shutter.

9. A shutter tripper adapted for use with a photographic shutter having a release member, and comprising a sleeve adapted to be fixedly mounted relative to said release member, a housing movably mounted on said sleeve to move to and from a cocked position relative thereto, a plunger for actuating said release member reciprocally mounted in said housing to move therewith to said cocked and uncocked positions, and movable relative thereto to move beyond said cocked position to a shutter operating position, a spring normally moving said housing and plunger to said uncocked position, means for automatically locking said housing in said cocked position when the same is moved thereto, said locking means including a ball loosely mounted in and extending through an opening in said sleeve and engaging said housing, said ball adapted to enter a corresponding recess in said housing when the latter is moved to its cocked position, a collar surrounding said sleeve and ball and movable longitudinally thereof between release and locking positions, said collar having a surface engaging said ball and adapted to move the same into, and hold the same in, said recess when moved to its locking position, and adapted to free said ball and permit the same to leave said recess when moved to its release position, said collar normally moved to its locking position by said aforementioned spring and manually movable against the action of said spring to a release position, and electro-magnetic means for moving said plunger relative to said housing to said shutter operating position.

10. A shutter tripper adapted for use with a photographic shutter having a release member, and comprising a sleeve adapted to be fixedly mounted relative to said release member, a housing movably mounted on said sleeve to move to and from a cocked position relative thereto and including an energizable solenoid, a plunger for actuating said release member reciprocally mounted in said housing to move therewith to said cocked and uncocked positions, and movable relative to said housing upon energization of said solenoid to move beyond said cocked position to a shutter operating position, means for automatically locking said housing in said cocked position when the same is moved thereto, means for releasing said housing from said cocked position, and means for moving said housing and plunger to said uncocked position upon release of said locking means, said last-mentioned means forming a part of said locking means.

JOHN WARREN GILLON.
JOHN C. HOLLISTER.